(12) United States Patent
Hong

(10) Patent No.: US 12,402,103 B2
(45) Date of Patent: Aug. 26, 2025

(54) DATA TRANSMISSION METHOD, COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 371 days.

(21) Appl. No.: 17/909,123

(22) PCT Filed: Mar. 5, 2020

(86) PCT No.: PCT/CN2020/078020
§ 371 (c)(1),
(2) Date: Sep. 2, 2022

(87) PCT Pub. No.: WO2021/174493
PCT Pub. Date: Sep. 10, 2021

(65) Prior Publication Data
US 2023/0100556 A1 Mar. 30, 2023

(51) Int. Cl.
*H04W 72/02* (2009.01)
*H04W 36/00* (2009.01)
(Continued)

(52) U.S. Cl.
CPC ....... *H04W 72/02* (2013.01); *H04W 36/0055* (2013.01); *H04W 36/06* (2013.01);
(Continued)

(58) Field of Classification Search
CPC . H04W 72/02; H04W 36/0055; H04W 36/06; H04W 52/365; H04W 52/367;
(Continued)

(56) References Cited

U.S. PATENT DOCUMENTS 9,408,104 B1 * 8/2016 Vivanco ................ H04L 47/83
2007/0230397 A1 10/2007 Sakata
(Continued)

FOREIGN PATENT DOCUMENTS

| CN | 101409921 A | 4/2009 |
| CN | 101523784 A | 9/2009 |

(Continued)

OTHER PUBLICATIONS

ZTE Corporation: "Draft CR to 38.101-1:introduction of completed band combinations of inter-band 2UL CA", 3GPP TSG RAN WG4 Meeting #87 R4-1806669, May 25, 2018.
(Continued)

*Primary Examiner* — Mohammad S Adhami
*Assistant Examiner* — Andrew Chanul Kim
(74) *Attorney, Agent, or Firm* — Volpe Koenig

(57) ABSTRACT

Examples of the present disclosure provide a data transmission method performed by a terminal. The method includes: sending a resource block (RB) location switching request to a base station; receiving, from the base station, feedback information for the RB location switching request; and sending data on an RB-before-switching or on an RB-after-switching according to the feedback information.

16 Claims, 8 Drawing Sheets

(51) Int. Cl.
*H04W 36/06* (2009.01)
*H04W 52/36* (2009.01)
*H04W 72/044* (2023.01)
*H04W 72/21* (2023.01)
*H04W 36/32* (2009.01)

(52) U.S. Cl.
CPC ....... *H04W 52/365* (2013.01); *H04W 52/367* (2013.01); *H04W 72/044* (2013.01); *H04W 72/21* (2023.01); *H04W 36/322* (2023.05)

(58) Field of Classification Search
CPC .. H04W 72/044; H04W 72/21; H04W 36/322
See application file for complete search history.

(56) References Cited

U.S. PATENT DOCUMENTS

| | | | |
|---|---|---|---|
| 2010/0177715 A1 | 7/2010 | Ofuji et al. | |
| 2010/0311452 A1 | 12/2010 | Li et al. | |
| 2012/0008517 A1* | 1/2012 | Imamura | H04L 1/0026 370/252 |
| 2013/0064119 A1* | 3/2013 | Montojo | H04W 24/00 370/335 |
| 2017/0094663 A1* | 3/2017 | Yun | H04L 5/0057 |
| 2018/0184418 A1* | 6/2018 | Takeda | H04W 72/0473 |
| 2019/0045484 A1* | 2/2019 | Liu | H04W 72/04 |
| 2020/0205126 A1 | 6/2020 | Wu | |
| 2020/0374804 A1* | 11/2020 | Mukkavilli | H04L 5/0044 |
| 2021/0144652 A1* | 5/2021 | Gheorghiu | H04W 52/34 |
| 2023/0112196 A1* | 4/2023 | Kim | H04W 74/0833 370/329 |

FOREIGN PATENT DOCUMENTS

| | | |
|---|---|---|
| CN | 102083129 A | 6/2011 |
| CN | 102378261 A | 3/2012 |
| CN | 106031230 A | 10/2016 |
| CN | 107615852 A | 1/2018 |
| CN | 108029117 A | 5/2018 |
| CN | 108207033 A | 6/2018 |
| CN | 109152023 A | 1/2019 |
| CN | 109392139 A | 2/2019 |
| WO | 2020029081 A1 | 2/2020 |

OTHER PUBLICATIONS

R1-1807801_summary of BWP remaining issues_r10, 3GPP TSG RAN WG1 Meeting #92bis (2018).

* cited by examiner

DATA TRANSMISSION METHOD, COMMUNICATION DEVICE AND STORAGE MEDIUM

CROSS-REFERENCE TO RELATED APPLICATION

The present application is a U.S. National Phase Application of International Patent Application Serial No. PCT/CN2020/078020 filed on Mar. 5, 2020. The entire contents of the above-cited application are hereby incorporated by reference in their entirety for all purposes.

BACKGROUND

Since the coverage area of a wireless communication network directly impacts the operator's Quality of Service (QoS), Capital Expenditure (CAPEX) and Operating Expense (OPENX), the coverage area of the wireless communication network is an important factor that the operator needs to consider when deploying a commercial cellular wireless communication system. A 5G New Radio (NR) system may have a larger path loss than a 4G Long Term Evolution (LTE) system due to the higher spectrum used. This poses greater challenges for coverage of the 5G system, in particular the uplink coverage capability of the 5G system.

SUMMARY

The present disclosure relates to, but is not limited to, the field of wireless communication technology, in particular to a data transmission method, an apparatus, a communication device, and a storage medium.

According to a first aspect of the examples of the disclosure, there is provided a data transmission method, performed by a terminal and including:
  sending a resource block (RB) location switching request to a base station;
  receiving, from the base station, feedback information for the RB location switching request; and
  transmitting, according to the feedback information, data on an RB-before-switching or on an RB-after-switching. According to a second aspect of the examples of the disclosure, there is provided a data transmission method, performed by a base station and including:
  receiving a resource block (RB) location switching request sent by a terminal; and
  sending feedback information to the terminal based on the RB location switching request; where the feedback information is configured to instruct the terminal to transmit data on an RB-before-switching or on an RB-after-switching. According to a third aspect of the examples of the disclosure, there is provided a data transmission apparatus applied to a terminal, the apparatus including a first sending module, a first receiving module, and a processing module.

The first sending module is configured to send a resource block (RB) location switching request to a base station.

The first receiving module is configured to receive feedback information for the RB location switching request from the base station.

The processing module is configured to transmit data on an RB-before-switching or on an RB-after-switching according to the feedback information. According to a fourth aspect of the examples of the disclosure, there is provided a data transmission apparatus applied to a base station, the apparatus including a second receiving module and a second sending module.

The second receiving module is configured to receive a resource block (RB) location switching request sent by a terminal.

The second sending module is configured to send feedback information to the terminal based on the RB location switching request; where, the feedback information is configured to instruct the terminal to transmit data on an RB-before-switching or on an RB-after-switching.

According to a fifth aspect of the examples of the disclosure, there is provided a communication device, including:
  an antenna;
  a memory; and
  a processor, in connection with the antenna and the memory respectively, and configured to control the antenna to transceive wireless signals by executing executable program stored on the memory, and capable of implementing the data transmission method provided in any one of the aforementioned technical solutions.

According to a sixth aspect of the examples of the disclosure, there is provided a non-transitory computer-readable storage medium storing an executable program, the executable program, when executed by a processor, implements the steps of the data transmission method according to any one of the aforementioned technical solutions.

DETAILED DESCRIPTION

Description will now be made in detail to examples, which are illustrated in the accompanying drawings. When the following description refers to drawings, the same numbers in different drawings refer to the same or similar elements unless otherwise indicated. The implementations described in the following examples do not represent all the implementations consistent with the present examples. Rather, they are examples of apparatuses and methods consistent with some aspects of the examples of the present disclosure as detailed in the appended claims.

The terms used in the examples of the disclosure are for the purpose of describing particular examples and are not intended to limit the examples of the disclosure. As used in the examples of the disclosure and the appended claims, the singular forms "a", "an", and "the" are intended to include the plural forms as well, unless the context clearly indicates other meanings. It will also be understood that the term "and/or" as used herein refers to and encompasses any and all possible combinations of one or more of the associated listed items.

It should be understood that although the terms of first, second, third, etc. may be employed in the examples of the disclosure to describe various information, such information should not be limited to these terms. These terms are used to distinguish the same type of information from each other. For example, the first information could also be referred to as the second information, and similarly, the second information could also be referred to as the first information, without departing from the scope of the examples of the disclosure. As used herein, the word "if" may be interpreted as "upon" or "when" or "in response to determining", depending on the context.

Figure 1:
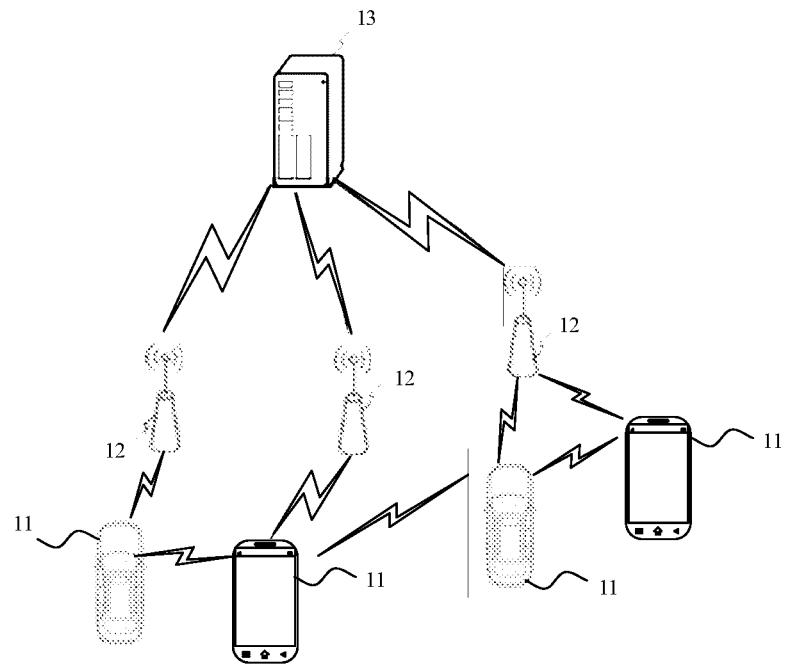
FIG. 1 is a structural diagram of a wireless communication system according to an example of the disclosure.

Referring to FIG. 1, which is a structural diagram illustrating a wireless communication system according to an example of the disclosure. As shown in FIG. 1, the wireless communication system is a communication system based on a cellular mobile communication technology, which may include several terminals 11 and several base stations 12.

The terminal 11 may be a device providing voice and/or data connectivity to a user. The terminal 11 may communicate with one or more core networks via the radio access network (RAN). The terminal 11 may be an internet of things terminal such as a sensor device, a mobile phone (otherwise known as the "cellular" phone) and a computer having the internet of things terminal, e.g., a stationary, portable, pocket-storable, hand-held, computer-built or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be an in-vehicle device, e.g., a trip computer with a wireless communication function, or a wireless communication device externally connected to a trip computer. Alternatively, the terminal 11 may be a roadside device, such as a street light, a signal light, or other roadside devices having the wireless communication function.

The base station 12 may be a network-side device in the wireless communication system. The wireless communication system may be a 4th generation mobile communication (4G) system, also known as a long term evolution (LTE) system. Alternatively, the wireless communication system may also be a 5G system, also referred to as a new radio (NR) system or a 5G NR system. Alternatively, the wireless communication system may also be a next generation system of the 5G system. The access network in the 5G system may be referred to as a New Generation-Radio Access Network (NG-RAN), or an MTC system.

The base station 12 may be an evolved base station (eNB) employed in the 4G system. Alternatively, the base station 12 may also be a base station employing a centralized distributed architecture (gNB) in the 5G system. In the case that the base station 12 employs the centralized distributed architecture, it typically includes a central unit (CU) and at least two distributed units (DU). The centralized unit is provided with protocol stacks of a packet data convergence protocol (PDCP) layer, a radio link control (RLC) layer, and a media access control (MAC) layer. A protocol stack of physical (PHY) layer is provided in the distributed unit. The particular implementation of the base station 12 is not limited in the examples of the disclosure.

A wireless connection may be established between the base station 12 and the terminal 11 via a radio air interface. In different implementations, the radio air interface is a radio air interface based on the 4th generation mobile communication network technology (4G) standard. Alternatively, the radio air interface is a radio air interface based on the 5th generation mobile communication network technology (5G) standard, for instance, the radio air interface is the new radio interface. Alternatively, the radio air interface may also be a radio air interface based on a next-generation mobile communication network technology standard for 5G.

In some examples, the E2E (End to End) connections may also be established among terminals 11, such as the scenarios of V2V (vehicle to vehicle) communication, V2I (vehicle to Infrastructure) communication, and V2P (vehicle to pedestrian) communication in vehicle to everything (V2X) communication.

In some examples, the wireless communication system described above may also include a network management device 13.

Several base stations 12 are each connected to the network management device 13. The network management device 13 may be a core network device in the wireless communication system, e.g., the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF) unit, or a home subscriber server (HSS), etc. The examples of the disclosure do not limit the implementation of the network management device 13.

In the power control algorithm of the 4G and 5G standards, the maximum power that the terminal can actually output is limited by the configured power. The indicators of maximum power reduction (MPR) and additional maximum power reduction (A-MPR) are strongly related to the location of the resource block (RB) in the channel bandwidth according to the calculation formula for configured power in the 3GPP terminal radio frequency standard TS38.101-1. In the case that the resource block is at the edge of the channel, its power reduction may be required to be somewhat larger due to the requirement of out-of-band transmission, possibly 3 dB larger than the power reduction in the case where the resource block is in the middle of the channel. This may diminish the uplink coverage capability of the communication network, and impact the uplink coverage of the communication network.

In order to better understand the solution described in any one of the examples of the disclosure, a relation between a power indicator of the terminal during data transmission and a resource block (RB) location during data transmission is explained according to one example of the disclosure.

Figure 2:
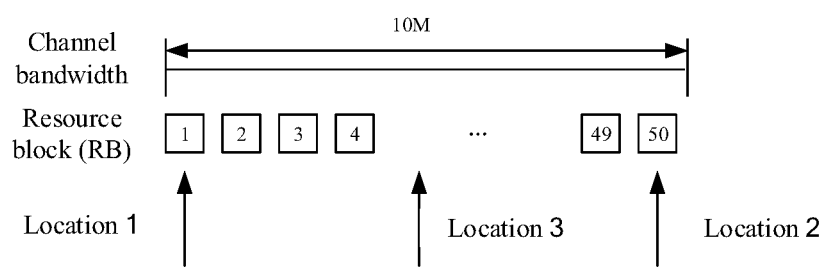
FIG. 2 is a schematic diagram of the location of a resource block (RB) in a channel bandwidth according to an example of the disclosure.

Referring to FIG. 2, in one example, the terminal transmits data on resource block scheduled by the base station during data transmission. One channel in which the terminal transmits data corresponds to a bandwidth of 10M, which may be divided into 50 resource blocks (RBs). The locations of the resource blocks (RBs) in the channel bandwidth may be numbered by numbers, and the locations of 50 resource blocks (RBs) are respectively numbered 1, 2, . . . , 50. The location 1 and location 2 indicated in FIG. 2 may be defined as edge locations. For example, the locations numbered 1 to 15 may be edge locations; the locations numbered 36 to 50 may also be edge locations. The location 3 may be defined as a middle location. For example, the locations numbered 16 to 35 may be middle locations.

The indicators of MPR and A-MPR when the terminal transmits signals are strongly related to the location of the resource block (RB) in the channel bandwidth. In the case that the resource block is at the edge of the channel (such as location 1 or location 2 in FIG. 2), the power reduction of the transmitted data of the terminal may be required to be somewhat larger due to the requirement of out-of-band transmission, possibly 3 dB larger than the power reduction in the case where the resource block is in the middle of the channel (such as location 3 in FIG. 2). This has a large impact on the uplink coverage. Thus, it becomes crucial how to guarantee that the resource block (RB) allocated to the terminal, in particular the terminal at the edge of the cell, is as close as possible to the middle of the channel. This may not only improve the uplink coverage capability of the cell, but also improve the efficiency of power amplifier of the terminal since the requirement for power reduction is lowered, thus facilitating energy saving of the terminal.

Figure 3:
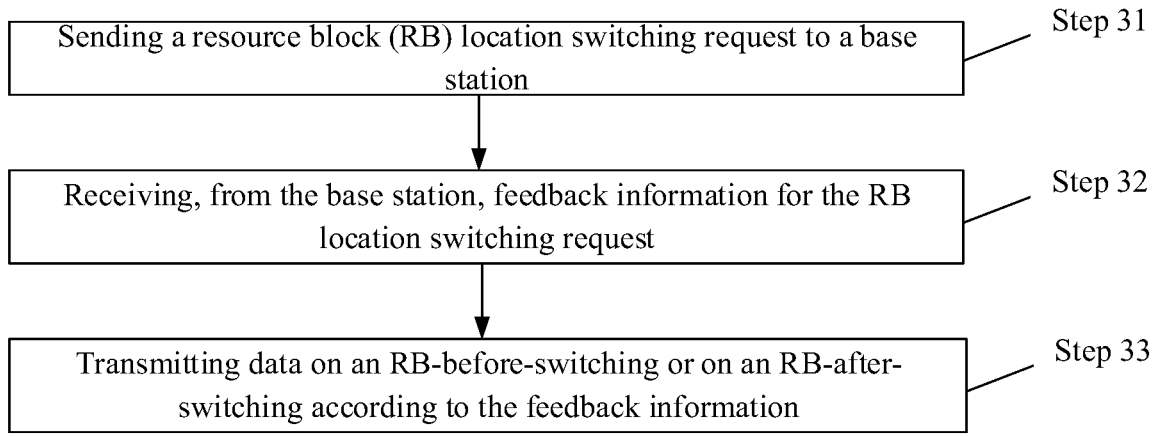
FIG. 3 is a schematic diagram of a data transmission method according to an example of the disclosure.

As shown in FIG. 3, there is provided a data transmission method according to an example of the disclosure. The method is performed by a terminal and includes the following steps.

Step 31, sending a resource block (RB) location switching request to a base station.

In one example, the terminal may be a terminal to be arranged at edge area of a communication cell, for example, an electric meter, a water meter, and the like. In another example, the terminal may be a terminal to be provided in a closed or semi-closed environment, for example, an environmental monitoring sensor, an industrial wireless sensor, etc. In another example, the terminal may be a terminal that regularly moves into the above-described edge area or closed environment, for example, a cell phone, a vehicle-mounted device, a wearable device, and the like. These terminals typically have poor communication signals due to being easily blocked by objects in the environment.

In one example, the location of the resource block (RB) may be the location of the resource block (RB) in the channel bandwidth. It should be noted that in the examples of the present disclosure, the location of each resource block (RB) is indicated by a number. For example, the location of each resource block (RB) is illustrated in FIG. 2 by the number "1", the number "2", and so on.

In one example, the location of the resource block (RB) may correspond to a location range in the channel bandwidth. The location range may be a location range near the middle of the channel bandwidth. The location range may also be a location range close to the edge of the channel bandwidth. For example, referring again to FIG. 2, the location range near the edge of the channel bandwidth may be a location range containing number 1 to number 15; the location range close to the edge of the channel bandwidth may also be a location range containing number 36 to number 50. The location range near the middle of the channel bandwidth may be a location range containing number 16 to number 35.

In another example, the location of the resource block (RB) may correspond to a specific certain location in the channel bandwidth, for example, the location numbered 3 in FIG. 2.

In one example, the resource block (RB) location switching may be switching a resource block (RB) located at a first location in the channel bandwidth to a resource block (RB) located at a second location in the channel bandwidth. The first location may be within a location range at the edge of the channel bandwidth; the second location may be within a location range in the middle of the channel bandwidth.

In another example, the resource block (RB) location switching may also be switching a resource block (RB) located within a first location range in the channel bandwidth to a resource block (RB) located within a second location range in the channel bandwidth. The first location range may be a location range at the edge of the channel bandwidth; the second location range may be a location range in the middle of the channel bandwidth.

Returning back to FIG. 3, Step 32 consists of receiving feedback information for the RB location switching request from the base station.

In one example, the feedback information may be feedback information generated by the base station based on the RB location switching request after the base station receives the resource block (RB) location switching request sent by the terminal. The feedback information is configured to instruct the terminal to transmit data on an RB-before-switching or on an RB-after-switching.

Finally, Step 33 includes transmitting data on an RB-before-switching or on an RB-after-switching according to the feedback information.

In one example, in response to the feedback information instructing the terminal to transmit data on the RB-before-switching, the terminal performs data transmission on the existing RB.

In another example, in response to the feedback information instructing the terminal to transmit data on the RB-after-switching, the terminal performs data transmission on the RB-after-switching.

The RB-after-switching may be a resource block rescheduled by the base station for the terminal.

In examples of the disclosure, the terminal may send the resource block (RB) location switching request to the base station, request the base station to switch the location of the resource block (RB), and transmit data on the RB-before-switching or on the RB-after-switching based on the feedback information of the base station. Since the terminal is able to request the base station to flexibly switch the location of the resource block when transmitting data, and the location of the resource block is related to power indicators such as maximum power reduction, additional maximum power reduction and the like of the terminal when transmitting data, the terminal can reduce the power reduction by switching the location of the resource block (RB), and the uplink coverage capability of the communication network is improved. Additionally, the efficiency of the power amplifier of the terminal can be improved, and energy saving of the terminal is facilitated.

Figure 4:
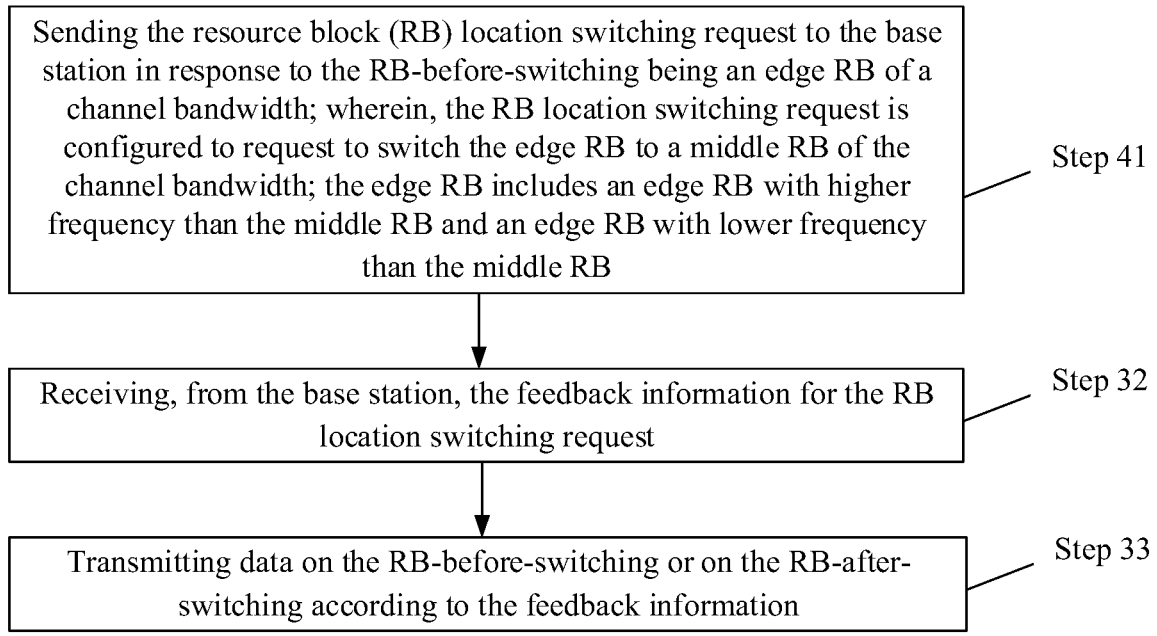
FIG. 4 is a schematic diagram of a data transmission method according to another example of the disclosure.

As shown in FIG. 4, another example of the disclosure provides a data transmission method, the step 31 of sending the resource block (RB) switching request to the base station includes Step 41.

Step 41 includes sending the resource block (RB) location switching request to the base station in response to the RB-before-switching being an edge RB of a channel bandwidth; the RB location switching request is configured to request to switch the edge RB to a middle RB of the channel bandwidth; the edge RB includes an edge RB with higher frequency than the middle RB and an edge RB with lower frequency than the middle RB.

In one example, the edge RB of the channel bandwidth may be a resource block (RB) located within a range of edge locations of the channel bandwidth. For example, referring again to FIG. 2, the edge resource block (RB) of the channel bandwidth may be any resource block (RB) located at locations numbered 1 to 15; the edge resource block (RB) of the channel bandwidth can also be any resource block (RB) located at locations numbered 36 to 50.

In one example, the middle RB of the channel bandwidth may be a resource block (RB) located within a range of middle locations of the channel bandwidth. For example, referring again to FIG. 2, the middle resource block (RB) of the channel bandwidth may be any resource block (RB) located at the locations numbered 20 to 35.

In one example, referring again to FIG. 2, a range of a frequency $f_1$ corresponding to the edge resource blocks (RBs) numbered 1 to 15 is $a<f_1<b$; a range of a frequency $f_2$ corresponding to the middle resource blocks (RBs) numbered 16 to 35 is $c<f_2<d$; and a range of a frequency $f_3$ corresponding to the edge resource blocks (RBs) numbered 36 to 50 is $e<f_3<f$; and $a<b<c<d<e$.

Switching the edge RB of the channel bandwidth for data transmission to the middle RB of the channel bandwidth by the terminal can reduce the power reduction, thus improving the uplink coverage capability of the communication network, improving the efficiency of the power amplifier of the terminal, and facilitating energy saving of the terminal.

Figure 5:
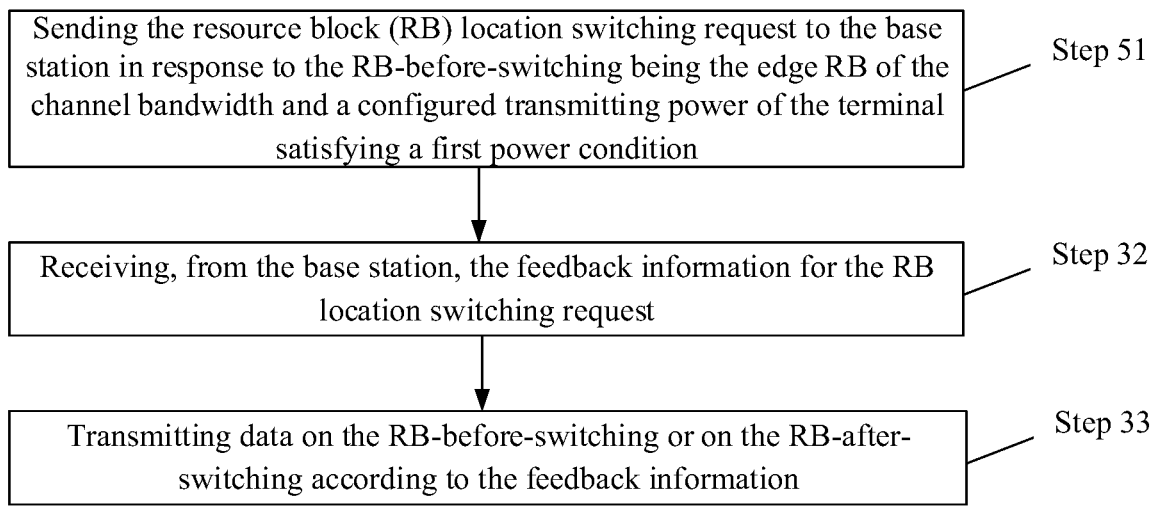
FIG. 5 is a schematic diagram of a data transmission method according to another example of the disclosure.

As shown in FIG. 5, another example of the disclosure provides a data transmission method, the step 41 of sending the resource block (RB) location switching request to the base station in response to the RB-before-switching being the edge RB of the channel bandwidth includes Step 51.

In Step 51, in response to the RB-before-switching being the edge RB of the channel bandwidth and a configured transmitting power of the terminal satisfying a first power condition, sending the resource block (RB) location switching request to the base station.

In one example, the configured transmitting power of the terminal may be the maximum power that the terminal is able to transmit.

The configured transmitting power of the terminal may vary with a change in time or a change in space. In one example, at a first time point, the configured transmitting power of the terminal is a first transmitting power; at a second time point, the configured transmitting power of the terminal is a second transmitting power. The first time point is different from the second time point. In another example, in a first area of the cell, the configured transmitting power of the terminal is the first transmitting power; in a second area of the cell, the configured transmitting power of the terminal is the second transmitting power. The first area is different from the second area. The first transmitting power is lower than the second transmitting power.

In one example, in response to the terminal being located at the edge area of the cell, the configured transmitting power of the terminal is P1. In response to the terminal being located in the middle area of the cell, the configured transmitting power of the terminal is P2; and P1<P2.

In another example, in response to the terminal being located in the ground area of the cell, the configured transmitting power of the terminal is P3. In response to the terminal being located in the underground area of the cell, the configured transmitting power of the terminal is P4; and P4<P3.

In one example, the configured transmitting power of the terminal satisfies the first power condition includes: a power headroom (PH), obtained by subtracting an actual transmitting power of the terminal from the configured transmitting power of the terminal, is lower than a first power threshold.

In one example, in the case that the power headroom (PH) is lower than the first power threshold, the configured transmitting power of the terminal is smaller, and the uplink coverage capability of the terminal is weaker. In this case, switching the edge RB for data transmission to the middle RB of the channel bandwidth can reduce the power reduction in time, thus improving the uplink coverage capability of the communication network, and improving the efficiency of the power amplifier of the terminal, which is advantageous for energy saving of the terminal.

In another example, the configured transmitting power of the terminal satisfies the first power condition includes: a change of the configured transmitting power of the terminal in unit time is greater than a set change rate. For example, at a first time t1, the configured transmitting power of the terminal is m; at a second time t2, the configured transmitting power of the terminal is n; the rate of change is set to be X; then it is determined that the configured transmitting power of the terminal satisfies the first power condition in response to $(n-m)/(t2-1)>X$. The configured transmitting power of the terminal may be caused by the terminal entering the edge area of the cell; it may also be caused by the terminal entering an enclosed space.

Figure 6:
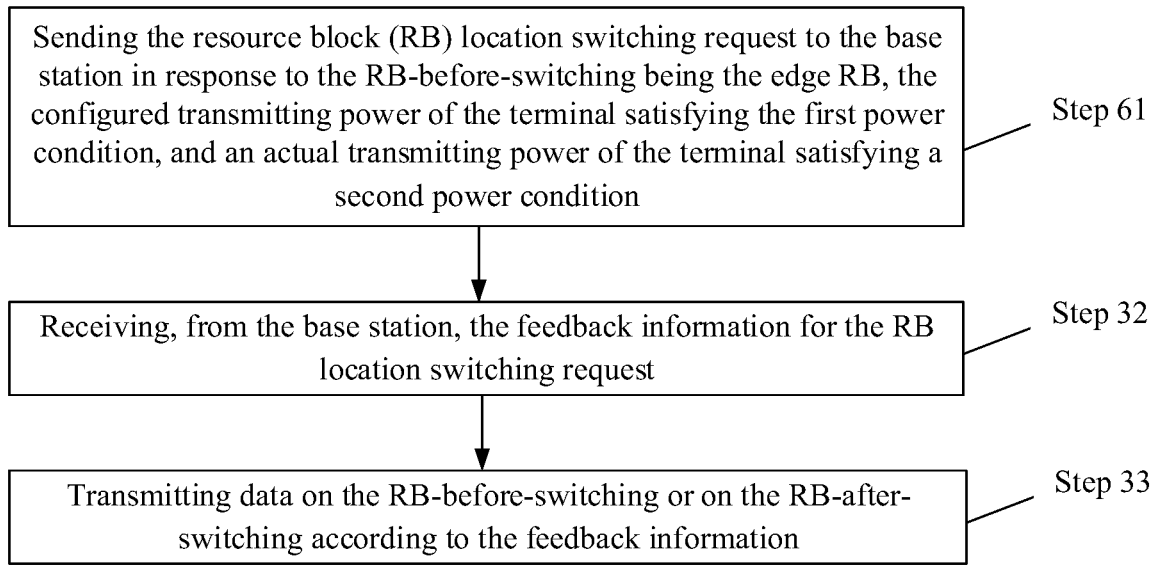
FIG. 6 is a schematic diagram of a data transmission method according to another example of the disclosure.

In another example, the configured transmitting power of the terminal satisfies the first power condition includes: a difference, obtained by subtracting the configured transmitting power from a power corresponding to a power class of the terminal, is higher than a second power threshold. Different terminals may correspond to different power classes. Different power classes may correspond to different power values. For example, the first power class corresponds to a power value of T1; the second power class corresponds to a power value of T2 and so on. As shown in FIG. 6, another example of the disclosure provides a data transmission method, the step 51 of sending the resource block (RB) location switching request to the base station in response to the RB-before-switching being the edge RB of the channel bandwidth and the configured transmitting power of the terminal satisfying the first power condition includes Step 61.

Step 61 includes sending the resource block (RB) location switching request to the base station in response to the RB-before-switching being the edge RB, the configured transmitting power of the terminal satisfying the first power condition, and an actual transmitting power of the terminal satisfying a second power condition.

In one example, the parameters of the actual transmitting power of the terminal may include maximum power reduction (MPR), additional maximum power reduction (A-MPR), and permitted maximum power reduction (P-MPR). The maximum power reduction (MPR), the additional maximum power reduction (A-MPR), and the permitted maximum power reduction (P-MPR) may vary following the change of the location of the terminal. For example, in the first location, the maximum power reduction (MPR) is a1, the additional maximum power reduction (A-MPR) is b1, and the permitted maximum power reduction (P-MPR) is c1; in the second location, the maximum power reduction (MPR) is a2, the additional maximum power reduction (A-MPR) is b2, and the permitted maximum power reduction (P-MPR) is c2.

In one example, the actual transmitting power of the terminal satisfies the second power condition, including: a difference, between a maximum of a maximum power reduction (MPR) and an additional maximum power reduction (A-MPR) of the terminal and a permitted maximum power reduction (P-MPR), is higher than or equal to a third power threshold.

In one example, the third power threshold is a difference between a permitted maximum transmitting power $P_{EMAX,c}$ configured for the terminal by the base station and a location coefficient $\Delta T_C$ of the channel bandwidth for data transmission in a frequency band.

$P_{EMAX,c}$ is the permitted maximum transmitting power configured by the base station for the terminal. The value of $P_{EMAX,c}$ is related to the location of the terminal. $\Delta T_C$ is a coefficient related to the location of the channel in the frequency band.

Figure 7A:
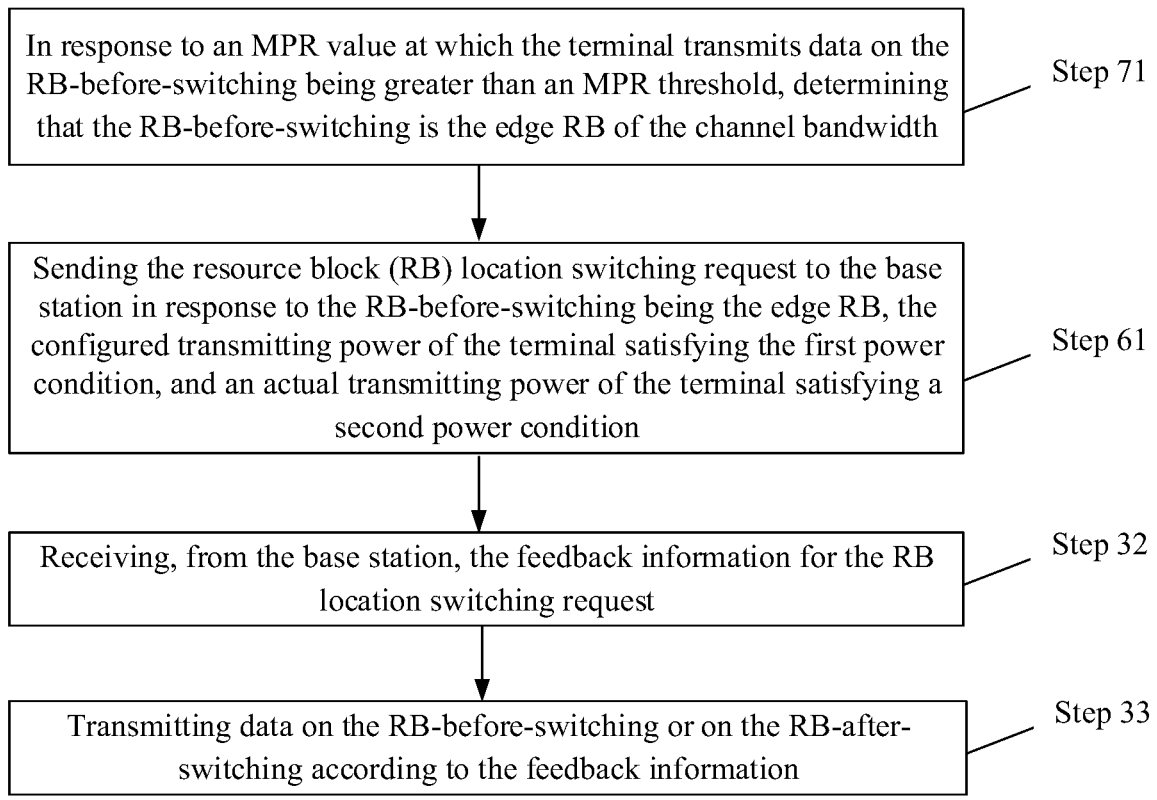
FIG. 7a is a schematic diagram of a data transmission method according to another example of the disclosure.

As shown in FIG. 7a, another example of the disclosure provides a data transmission method, the method further includes Step 71.

In Step 71, in response to an MPR value at which the terminal transmits data on the RB-before-switching being greater than an MPR threshold, determining that the RB-before-switching is the edge RB of the channel bandwidth.

Figure 7B:
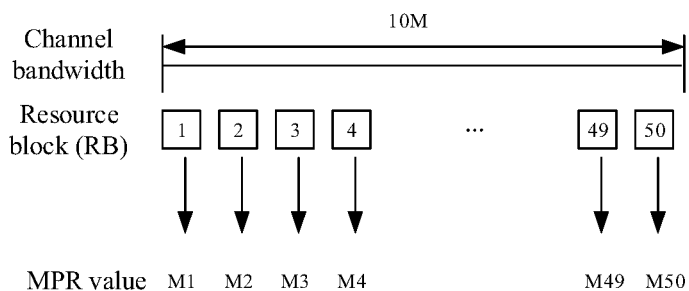
FIG. 7b is a schematic diagram of the relationship between the location of the resource block (RB) and an MPR value according to an example of the disclosure.

Since the maximum power reduction (MPR) of the terminal is related to the location of the resource block (RB) in the channel bandwidth, each maximum power reduction (MPR) corresponds to the location of one RB in the channel bandwidth, it is possible to determine that the RB-before-switching is the edge RB of the channel bandwidth in response to the MPR value at which the terminal transmits data on the RB-before-switching being greater than the MPR threshold. Referring to FIG. 7b, the location of each resource block (RB) located in the channel bandwidth corresponds to one MPR value, for example, the location numbered 1 corresponds to M1, the location numbered 2 corresponds to M2, etc.

In one example, the mapping relation of each maximum power reduction (MPR) value to the location number of the corresponding RB in the channel bandwidth may be stored in advance. In this way, after the terminal collects the maximum power reduction (MPR) value, it is possible to quickly determine the location of the corresponding RB in the channel bandwidth based on the mapping relation.

Figure 8:
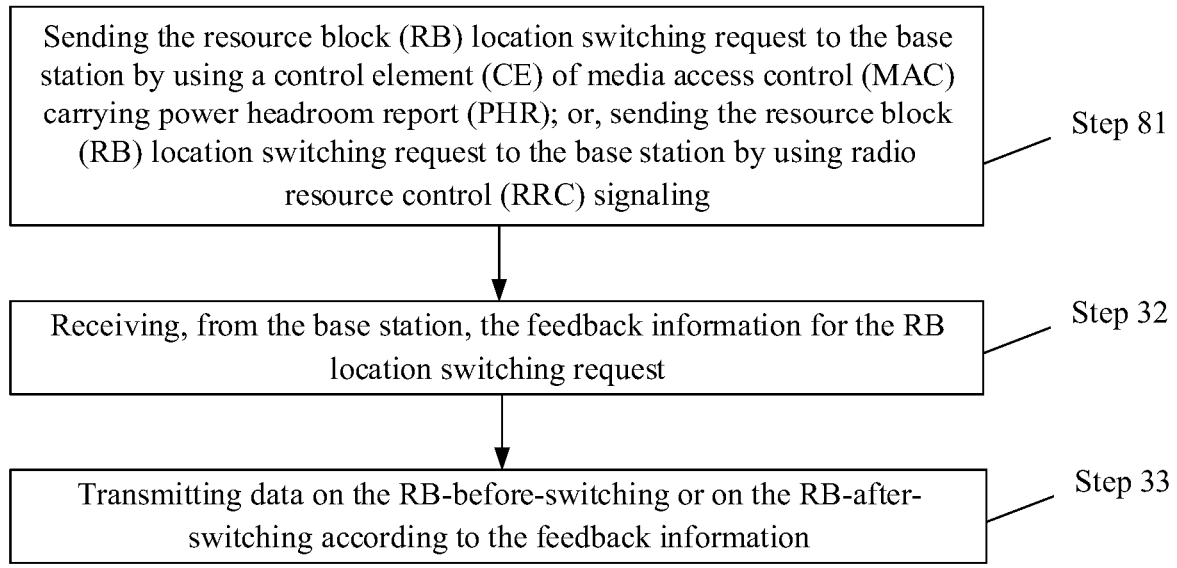
FIG. 8 is a schematic diagram of a data transmission method according to another example of the disclosure.

As shown in FIG. 8, another example of the disclosure provides a data transmission method, the step 31 of sending the resource block (RB) location switching request to the base station includes Step 81.

Step 81 includes sending the resource block (RB) location switching request to the base station by using a control element (CE) of media access control (MAC) carrying power headroom report (PHR); or sending the resource block (RB) location switching request to the base station by using radio resource control (RRC) signaling.

Figure 9:
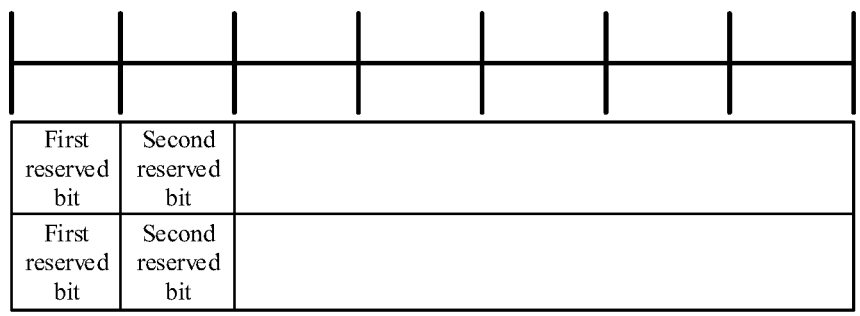
FIG. 9 is a schematic diagram of a control element (CE) according to an example of the disclosure.
Figure 10:
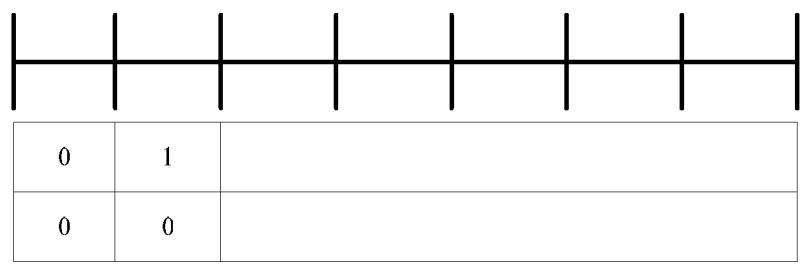
FIG. 10 is a schematic diagram of a control element (CE) according to another example of the disclosure.

In one example, the terminal sends the RB location switching request to the base station, the terminal may send the RB location switching request to the base station by using a reserved bit in a control element (CE) entity of media access control (MAC) carrying power headroom report (PHR) in 3GPP TS36.321 or TS38.321. In one example, referring to FIG. 9, the terminal may send the RB location switching request to the base station by using a second reserved bit. In one example, referring to FIG. 10, the reserved bit is "0" by default, and it is indicated that the resource block (RB) location switching request is sent to the base station in response to any one of the reserved bits (e.g., the second reserved bit) being set to be "1". It should be noted that "1" is not limited to the location in the figure, but can be any one of the four reserved bits in FIG. 10.

The radio resource control (RRC) signaling may be higher layer signaling of a radio resource control (RRC) layer.

Figure 11:
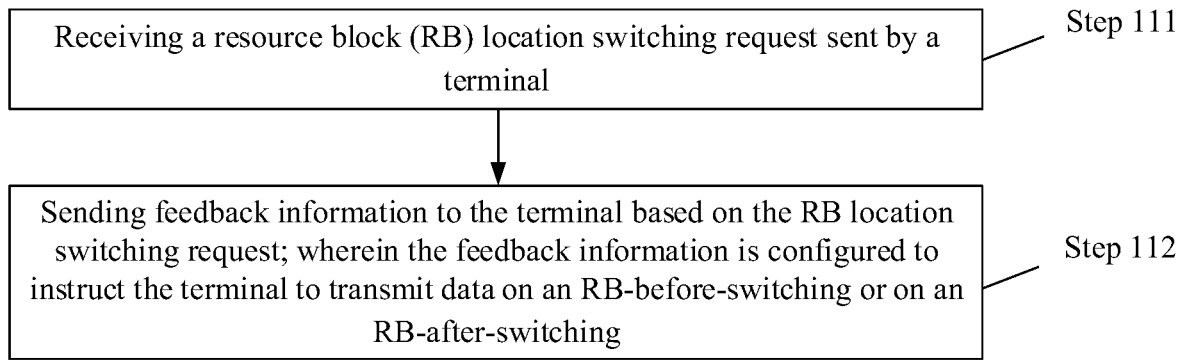
FIG. 11 is a schematic diagram of a data transmission method according to another example of the disclosure.

As shown in FIG. 11, another example of the disclosure provides a data transmission method, performed by a base station and including Step 111 and Step 112.

Step 111 includes receiving a resource block (RB) location switching request sent by a terminal.

In one example, the terminal may be a terminal to be arranged at edge area of a communication cell, for example, an electric meter, a water meter, and the like. In another example, the terminal may also be a terminal to be provided in a closed or semi-closed environment, for example, an environmental monitoring sensor, an industrial wireless sensor, etc. In another example, the terminal may also be a terminal that regularly moves into the above-described edge area or closed environment, for example, a cell phone, a vehicle-mounted device, a wearable device, and the like. These terminals typically have poor communication signals due to being easily blocked by objects in the environment. In one example, the location of the resource block (RB) may be the location of the resource block (RB) in the channel bandwidth.

In one example, the location of the resource block (RB) may correspond to one location range in the channel bandwidth. The location range may be a location range near the middle of the channel bandwidth; the location range may also be a location range close to the edge of the channel bandwidth. For example, referring again to FIG. 2, the location range near the edge of the channel bandwidth may be the location range containing number 1 to number 15; the location range close to the edge of the channel bandwidth may also be a location range containing number 36 to number 50. The location range near the middle of the channel bandwidth may be a location range containing number 16 to number 35.

In another example, the location of the resource block (RB) may correspond to a specific certain location in the channel bandwidth, for example, the location numbered 3 in FIG. 2.

In one example, the resource block (RB) location switching may be switching a resource block (RB) located at a first location in the channel bandwidth to a resource block (RB) located at a second location in the channel bandwidth. The first location may be within a location range at the edge of the channel bandwidth; the second location may be within a location range in the middle of the channel bandwidth.

In another example, the resource block (RB) location switching may also be switching a resource block (RB) located within a first location range in the channel bandwidth to a resource block (RB) located within a second location range in the channel bandwidth. The first location range may be a location range at the edge of the channel bandwidth; the second location range may be a location range in the middle of the channel bandwidth.

Referring back to FIG. 11, Step 112 includes sending feedback information to the terminal based on the RB location switching request; the feedback information is configured to instruct the terminal to transmit data on the RB-before-switching or on the RB-after-switching.

In one example, in response to the feedback information instructing the terminal to transmit data on the RB-before-switching, the terminal transmits data on the existing RB.

In another example, in response to the feedback information instructing the terminal to transmit data on the RB-after-switching, the terminal transmits data on the RB-after-switching. The RB-after-switching may be a resource block rescheduled by the base station for the terminal.

In one example of the disclosure, the base station may receive the resource block (RB) location switching request sent by the terminal, switch the location of the resource block (RB) based on the resource block (RB) location switching request, and feeds back information to the terminal, and the terminal transmits data on the RB-before-switching or on the RB-after-switching. Since the terminal is able to request the base station to flexibly switch the location of the resource block when transmitting data, and the location of the resource block is related to power indicators such as maximum power reduction, additional maximum power reduction, etc. of the terminal when transmitting data, in this way, the terminal can reduce the power reduction by switching the location of the resource block (RB) and the uplink coverage capability of the communication network is improved, the efficiency of the power amplifier of the terminal can be improved, and energy saving of the terminal is facilitated.

In one example, sending the feedback information to the terminal includes sending the feedback information for indicating to transmit data on a switched target RB to the terminal in response to the channel quality of the switched target RB being greater than a set threshold.

In one example, the switched target RB may be a resource block (RB) reallocated by the to-be-scheduled base station to the terminal for data transmission. In one example, the terminal currently transmits data by using a first resource block (RB), and the base station switches the first resource block (RB) to a second resource block (RB) by scheduling so that the terminal transmits data on the second resource block (RB), so the second resource block (RB) may be the switched target RB.

The channel quality may correspond to signal-to-noise ratio of the channel In one example, the channel quality of the RB-after-switching may be determined by channel quality indication (CQI). In one example, the value of the CQI may range from 0 to 31. The channel quality is the worst in the cast that the CQI takes a value of "0"; and the channel quality is the best in the case that the CQI takes a value of "31".

In one example, the set threshold is greater than a first value in the case that the requirement for the channel quality by the terminal is high; and the set threshold is greater than a second value in the case that the requirement for the channel quality by the terminal is low; where the first value is greater than the second value.

In one example, the RB-before-switching is the edge RB of the channel bandwidth; the RB-after-switching is the middle RB of the channel bandwidth. The edge RB includes an edge RB with higher frequency than the middle RB and an edge RB with lower frequency than the middle RB.

In one example, the edge RB of the channel bandwidth may be a resource block (RB) located within a range of edge locations of the channel bandwidth. For example, referring again to FIG. 2, the edge resource block (RB) of the channel bandwidth may be any resource block (RB) located at locations numbered 1 to 15; the edge resource block (RB) of the channel bandwidth can also be any resource block (RB) located at locations numbered 36 to 50.

In one example, the middle RB of the channel bandwidth may be a resource block (RB) located within a range of middle locations of the channel bandwidth. For example, referring again to FIG. 2, the middle resource block (RB) of the channel bandwidth may be any resource block (RB) located at locations numbered 20 to 35.

In one example, referring again to FIG. 2, a range of a frequency $f_1$ corresponding to the edge resource blocks (RBs) numbered 1 to 15 is $a<f_1<b$; a range of a frequency $f_2$ corresponding to the middle resource blocks (RBs) numbered 16 to 35 is $c<f_2<d$; and a range of a frequency $f_3$ corresponding to the edge resource blocks (RBs) numbered 36 to 50 is $e<f_3<f$, and $a<b<c<d<e$.

In one example, sending the feedback information to the terminal includes: sending the feedback information for indicating to transmit data on the middle RB to the terminal in response to the middle RB being idle.

In one example, the middle RB is idle, which means that the middle RB is not occupied by the terminal, i.e., the middle RB is not used to transmit data. Alternatively, the middle RB is idle, which means that the middle RB is in a state that can be allocated to the terminal for data transmission.

In one example, sending the feedback information to the terminal includes sending the feedback information for indicating to transmit data on the middle RB to the terminal in response to the middle RB being occupied by a user device located at central area of a cell.

In one example, the user device located at central area of the cell may be a user device located within a set range in the signal coverage range of the cell. For example, the signal coverage range of the cell is range A, the set range in the signal coverage range of the cell is range B, the range A includes the range B, and the range B is located in central area of the range A, so the user device within the range B may be the user device located in central area of the cell.

Because the user device is located in the central area of the cell, it has a better wireless communication signal than the user device at the edge of the cell, even if switching the middle RB that is already in use to the edge RB generates large power reduction, good quality of wireless communication can also be guaranteed.

In one example, the method further includes sending reallocation information for the RB to the user device of which the middle RB is preempted.

Since the middle RB of the user device is preempted, the reallocation information for the RB is sent to the user device of which the middle RB is preempted, so that the user device is able to acquire the reallocated RB in time and transmit data on the reallocated RB. In one example, the reallocated RB may be an edge RB.

Figure 12:
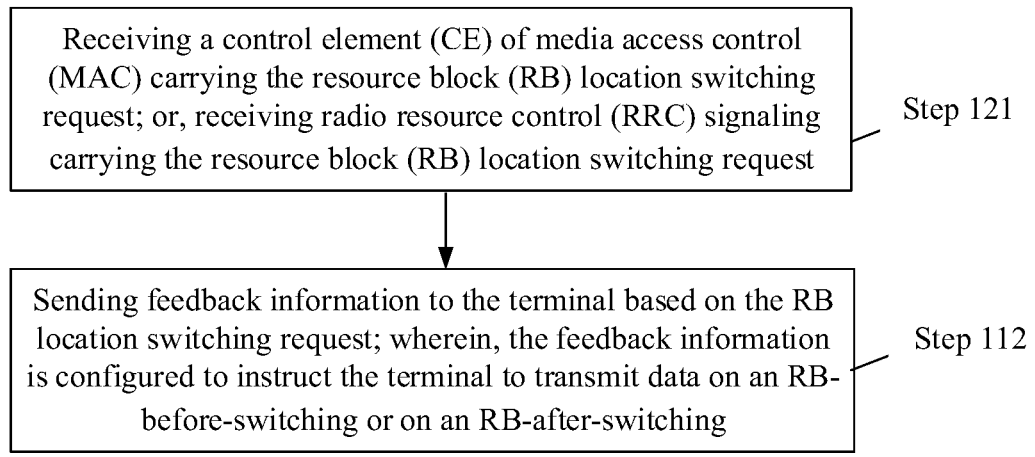
FIG. 12 is a schematic diagram of a data transmission method according to another example of the disclosure.

As shown in FIG. 12, another example of the disclosure provides a data transmission method, the step 111 of receiving the resource block (RB) location switching request sent by the terminal includes Step 121.

Step 121 includes receiving a control element (CE) of media access control (MAC) carrying the resource block (RB) location switching request; or receiving radio resource control (RRC) signaling carrying the resource block (RB) location switching request.

In one example, the terminal sends the RB location switching request to the base station, the terminal may send the RB location switching request to the base station by using a reserved bit in a control element (CE) entity of media access control (MAC) carrying power headroom report (PHR) in 3GPP TS36.321 or TS38.321. In one example, referring again to FIG. 9, the terminal may send the RB location switching request to the base station by using a second reserved bit. In one example, referring again to FIG. 10, the reserved bit is "0" by default, and it is indicated that the resource block (RB) location switching request is sent to the base station in response to any one of the reserved bits (e.g., the second reserved bit) being set to be "1". It should be noted that "1" is not limited to the location in the figure, but can be any one of the four reserved bits in FIG. 10.

The radio resource control (RRC) signaling may be higher layer signaling of a radio resource control (RRC) layer.

In one example, the MAC CE further carries a PHR.

Figure 13:
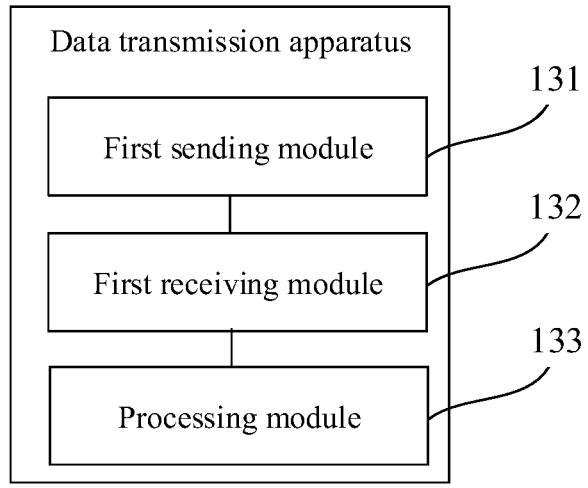
FIG. 13 is a schematic diagram of a data transmission apparatus according to an example of the disclosure.

As shown in FIG. 13, one example of the disclosure provides a data transmission apparatus applied to a terminal, the apparatus includes a first sending module 131, a first receiving module 132, and a processing module 133.

The first sending module 131 is configured to send a resource block (RB) location switching request to a base station.

The first receiving module 132 is configured to receive feedback information for the RB location switching request from the base station.

The processing module 133 is configured to transmit data on an RB-before-switching or on an RB-after-switching according to the feedback information.

In one example, the first sending module 131 is further configured to send the resource block (RB) location switching request to the base station in response to the RB-before-switching is an edge RB of a channel bandwidth; the RB location switching request is configured to request to switch the edge RB to a middle RB of the channel bandwidth; the edge RB includes an edge RB with higher frequency than the middle RB and an edge RB with lower frequency than the middle RB.

In one example, the first sending module 131 is further configured to send the resource block (RB) location switching request to the base station in response to the RB-before-switching is the edge RB of the channel bandwidth and a configured transmitting power of the terminal satisfying a first power condition.

In one example, the configured transmitting power of the terminal satisfies the first power condition includes: a power headroom (PH), obtained by subtracting an actual transmitting power of the terminal from the configured transmitting power of the terminal, is lower than a first power threshold; or, a difference, obtained by subtracting the configured transmitting power from a power corresponding to a power class of the terminal, is higher than a second power threshold. In one example, the first sending module 131 is further configured to send the resource block (RB) location switching request to the base station in response to the RB-before-switching is the edge RB, the configured transmitting power of the terminal satisfying the first power condition, and an actual transmitting power of the terminal satisfying a second power condition.

In one example, the actual transmitting power of the terminal satisfies the second power condition includes: a difference between a maximum of a maximum power reduction (MPR) and an additional maximum power reduction (A-MPR) of the terminal and a permitted maximum power reduction (P-MPR), is higher than or equal to a third power threshold.

In one example, the third power threshold is a difference between a permitted maximum transmitting power $P_{EMAX,c}$ configured for the terminal by the base station and a location coefficient $\Delta T_C$ of the channel bandwidth for data transmission in a frequency band.

In one example, the first sending module 131 is further configured to determine that the RB-before-switching is the edge RB of the channel bandwidth in response to an MPR value at which the terminal transmits data on the RB-before-switching being greater than an MPR threshold.

In one example, the first sending module 131 is further configured to send the resource block (RB) location switching request to the base station by using a control element (CE) of media access control (MAC) carrying power headroom report (PHR); or, send the resource block (RB) location switching request to the base station by using radio resource control (RRC) signaling.

Figure 14:
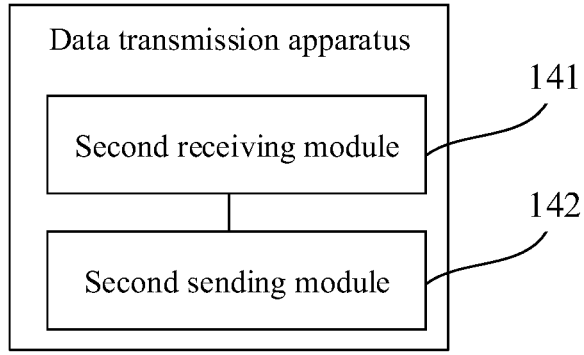
FIG. 14 is a schematic diagram of a data transmission apparatus according to another example of the disclosure.

As shown in FIG. 14, another example of the disclosure provides a data transmission apparatus applied to a base station, the apparatus includes a second receiving module 141 and a second sending module 142.

The second receiving module 141 is configured to receive a resource block (RB) location switching request sent by a terminal.

The second sending module 142 is configured to send feedback information to the terminal based on the RB location switching request; the feedback information is configured to instruct the terminal to transmit data on an RB-before-switching or on an RB-after-switching.

In one example, the second sending module 142 is further configured to send, to the terminal, the feedback information for indicating to transmit data on a switched target RB in response to the channel quality of the switched target RB being greater than a set threshold.

In one example, the RB-before-switching is an edge RB of a channel bandwidth; the RB-after-switching is a middle RB of the channel bandwidth; the edge RB includes an edge RB with higher frequency than the middle RB and an edge RB with lower frequency than the middle RB.

In one example, the second sending module 142 is further configured to send, to the terminal, the feedback information for indicating to transmit data on the middle RB in response to the middle RB being idle.

In one example, the second sending module 142 is further configured to send, to the terminal, the feedback information for indicating to transmit data on the middle RB in response to the middle RB being occupied by a user device located at central area of a cell.

In one example, the second sending module 142 is further configured to send reallocation information for the RB to a user device of which the middle RB is preempted.

In one example, the second receiving module 141 is further configured to receive a control element (CE) of media access control (MAC) carrying the resource block (RB) location switching request; or, receive radio resource control (RRC) signaling carrying the resource block (RB) location switching request.

In one example, the MAC CE further carries a PHR.

The examples of the disclosure further provide a communication device including:

an antenna;

a memory; and a processor, in connection with the antenna and the memory respectively, and configured to control the antenna to transceive wireless signals by executing executable program stored on the memory, and capable of implementing the data transmission method provided by any one of the preceding examples.

The communication device according to the example may be the aforementioned terminal or base station. The terminal may be any one of a variety of human-carried terminals or vehicle-mounted terminals. The base station may be any one of a variety of base stations, e.g., a 4G base station or a 5G base station, etc.

The antenna may be any one of a variety of antennas, e.g., a mobile antenna such as a 3G antenna, a 4G antenna, or a 5G antenna. The antenna may further include a WiFi antenna, a wireless charging antenna, or the like.

The memory may include various types of storage media, the storage media are non-transitory computer storage media and can continue to memorize the information stored thereon after the communication equipment is powered off.

The processor may be connected with the antenna and the memory via a bus or the like for reading an executable program stored on the memory, for example, at least one of the methods of any one of the examples of the disclosure.

The examples of the disclosure further provide a non-transitory computer-readable storage medium, the non-transitory computer-readable storage medium stores an executable program which, when executed by the processor, is capable of implementing the steps of the data transmission method provided in any one of the aforementioned examples, e.g., at least one of the methods of the examples of the disclosure.

Figure 15:
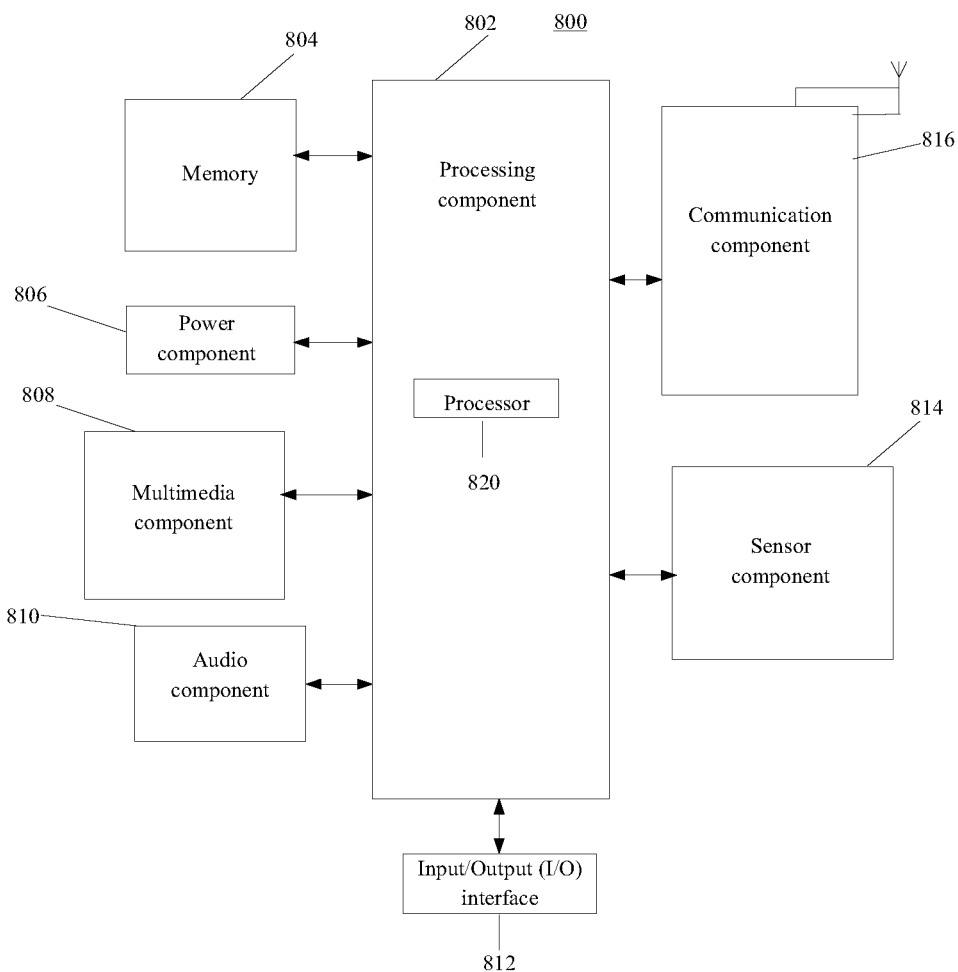
FIG. 15 is a structural diagram of a terminal according to an example of the disclosure.

As illustrated in FIG. 15, one example of the disclosure provides a structure of a terminal.

With reference to the terminal 800 shown in FIG. 15, the present example provides a terminal 800, which may specifically be a mobile phone, a computer, a digital broadcasting terminal, a message transceiving device, a game console, a tablet device, a medical device, a fitness device, a personal digital assistant, or the like.

Referring to FIG. 15, the terminal 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operations of the terminal 800, such as operations associated with display, phone calls, data communications, camera operations, and recording operations. The processing component 802 may include one or more processors 820 to execute instructions to perform all or part of the steps of the methods described above. Further, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support operations on the device 800. The examples of such data include instructions, contact data, phonebook data, messages, pictures, video, etc., for any application program or method operating on terminal 800. The memory 804 can be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 806 provides power for various components of the terminal 800. The power component 806 may include a power management system, one or more power sources, and other components associated with the generation, management, and distribution of power for the terminal 800.

The multimedia component 808 includes a screen that provides an output interface between the terminal 800 and a user. In some examples, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense a boundary of a touch or swipe action, but also detect the duration and pressure associated with the touch or swipe operation. In some examples, the multimedia component 808 includes a front camera and/or a rear camera. The front camera and/or the rear camera may receive external multimedia data when the terminal 800 is in an operation mode, such as a photography mode or a video mode. Each of the front camera and the rear camera may be a fixed optical lens system or has focal length and optical zooming capabilities.

The audio component 810 is configured to output and/or input audio signals. For example, the audio component 810 includes a microphone (MIC) configured to receive an external audio signal when the terminal 800 is in an operation mode such as a call mode, a recording mode, and a voice recognition mode. The received audio signals may be further stored in the memory 804 or sent via the communication component 816. In some examples, the audio component 810 further includes a speaker for outputting audio signals.

The I/O interface 812 provides an interface between the processing component 802 and peripheral interface modules, which may be keyboards, click wheels, buttons, and the like. These buttons may include, but are not limited to, a home button, a volume button, a start button, and a lock button.

The sensor component 814 includes one or more sensors for providing status evaluation of various aspects for the terminal 800. For example, the sensor component 814 may detect the on/off state of the terminal 800, and the relative positioning of components such as the display and keypad of the terminal 800, the sensor component 814 may also detect changes in the location of the terminal 800 or a component of the terminal 800, the presence or absence of contact between the user and the terminal 800, the orientation or acceleration/deceleration of the terminal 800, and temperature changes of the terminal 800. The sensor assembly 814 may include a proximity sensor configured to detect the presence of nearby objects in the absence of any physical contact. The sensor assembly 814 may also include a light sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate communication between the terminal 800 and other devices in a wired or wireless manner. The terminal 800 may access a wireless network based on a communication standard, such as Wi-Fi, 2G, or 3G, or their combination. In one example, the communication component 816 receives broadcast signals or broadcast related information from an external broadcast management system via a broadcast channel In an example, the communication component 816 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an example, the terminal 800 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above-described method.

In an example, there is also provided a non-transitory computer-readable storage medium, such as the memory 804 including instructions, the instructions are executable by the processor 820 of the terminal 800 to carry out the method described above. For example, the non-transitory computer-readable storage medium may be a ROM, a random access memory (RAM), a CD-ROM, a magnetic tape, a floppy disk, an optical data storage device, and the like.

The terminal may be configured to implement the aforementioned method, e.g., the method of any one of the examples of the disclosure.

Figure 16:
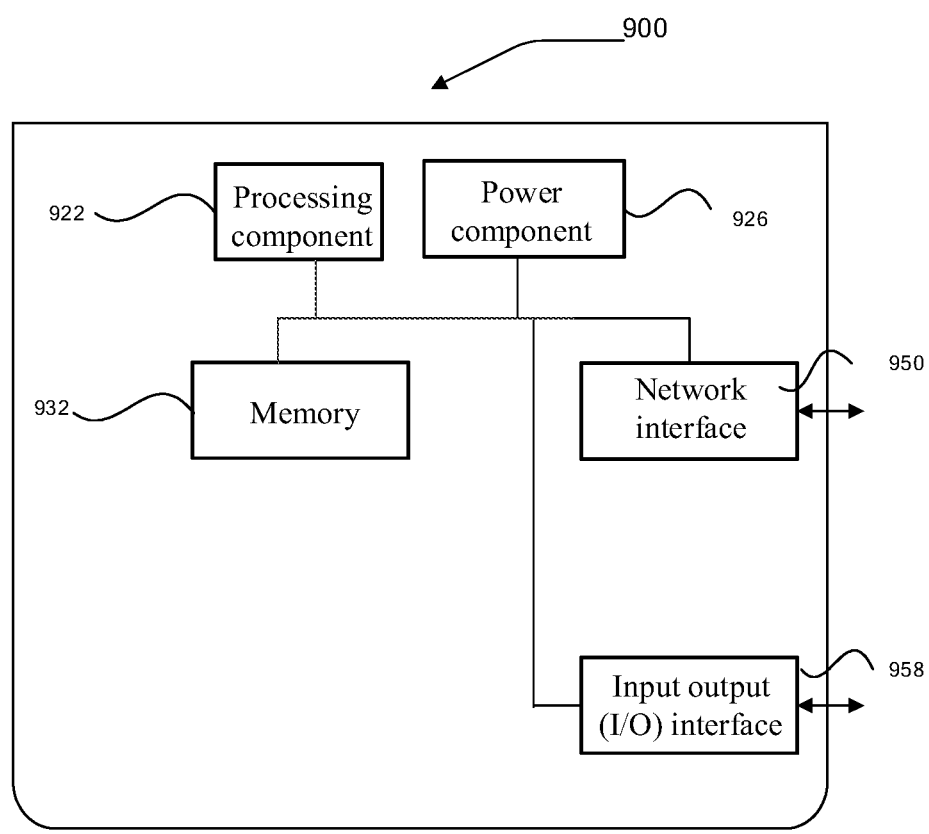
FIG. 16 is a structural diagram of a base station according to an example of the disclosure.

As shown in FIG. 16, one example of the disclosure provides a structure of a base station. For example, the base station 900 may be provided as a network-side device. Referring to FIG. 16, base station 900 includes: a processing component 922 that further includes one or more processors; and memory resources, represented by a memory 932, for storing instructions, such as an application program, executable by the processing component 922. Applications stored in the memory 932 may include one or more modules that each correspond to a set of instructions. Further, the processing component 922 is configured to execute instructions to perform any of the foregoing methods described above, such as a method according to any of the examples of the disclosure.

The base station 900 can also include a power component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, or the like.

The wireless network interface 950 includes, but is not limited to, an antenna of the aforementioned communication device.

Additional non-limiting embodiments of the disclosure include the following.

According to a first aspect of the examples of the disclosure, there is provided a data transmission method, performed by a terminal and including:
sending a resource block (RB) location switching request to a base station;
receiving, from the base station, feedback information for the RB location switching request; and
transmitting, according to the feedback information, data on an RB-before-switching or on an RB-after-switching.

In one example, sending the resource block (RB) location switching request to the base station includes:
sending the resource block (RB) location switching request to the base station in response to the RB-before-switching being an edge RB of a channel bandwidth; where the RB location switching request is configured to request to switch the edge RB to a middle RB of the channel bandwidth; the edge RB includes an edge RB with a higher frequency than the middle RB and an edge RB with a lower frequency than the middle RB.

In one example, sending the resource block (RB) location switching request to the base station in response to the RB-before-switching being the edge RB of the channel bandwidth includes:
sending the resource block (RB) location switching request to the base station in response to the RB-before-switching being the edge RB of the channel bandwidth and a configured transmitting power of the terminal satisfying a first power condition.

In one example, the configured transmitting power of the terminal satisfies the first power condition includes:
a power headroom (PH), obtained by subtracting an actual transmitting power of the terminal from the configured transmitting power of the terminal, is lower than a first power threshold; or a difference, obtained by subtracting the configured transmitting power from a power corresponding to a power class of the terminal, is higher than a second power threshold.

In one example, sending the resource block (RB) location switching request to the base station in response to the RB-before-switching being the edge RB of the channel bandwidth and the configured transmitting power of the terminal satisfying the first power condition includes:
sending the resource block (RB) location switching request to the base station in response to the RB-before-switching being the edge RB, the configured transmitting power of the terminal satisfying the first power condition, and an actual transmitting power of the terminal satisfying a second power condition.

In one example, the actual transmitting power of the terminal satisfies the second power condition includes:
a difference, between a maximum of a maximum power reduction (MPR) and an additional maximum power reduction (A-MPR) of the terminal and a permitted maximum power reduction (P-MPR), is higher than or equal to a third power threshold.

In one example, the third power threshold is a difference between a permitted maximum transmitting power $P_{EMAX,c}$ configured for the terminal by the base station and a location coefficient $\Delta T_C$ of the channel bandwidth for data transmission in a frequency band.

In one example, the method further includes:
in response to an MPR value at which the terminal transmits data on the RB-before-switching being greater than an MPR threshold, determining that the RB-before-switching is the edge RB of the channel bandwidth.

In one example, sending the resource block (RB) location switching request to the base station includes one of the following:
sending the resource block (RB) location switching request to the base station by using a control element (CE) of media access control (MAC) carrying power headroom report (PHR); and
sending the resource block (RB) location switching request to the base station by using radio resource control (RRC) signaling.

According to a second aspect of the examples of the disclosure, there is provided a data transmission method, performed by a base station and including:

receiving a resource block (RB) location switching request sent by a terminal; and sending feedback information to the terminal based on the RB location switching request; where the feedback information is configured to instruct the terminal to transmit data on an RB-before-switching or on an RB-after-switching.

In one example, sending the feedback information to the terminal includes:

sending, to the terminal, the feedback information for indicating to transmit data on a switched target RB in response to the channel quality of the switched target RB being greater than a set threshold.

In one example, the RB-before-switching is an edge RB of a channel bandwidth; the RB-after-switching is a middle RB of the channel bandwidth; the edge RB includes an edge RB with higher frequency than the middle RB and an edge RB with lower frequency than the middle RB.

In one example, sending the feedback information to the terminal includes:

sending, to the terminal, the feedback information for indicating to transmit data on the middle RB in response to the middle RB being idle.

In one example, sending the feedback information to the terminal includes:

sending, to the terminal, the feedback information for indicating to transmit data on the middle RB in response to the middle RB being occupied by a user device at central area of a cell.

In one example, the method further includes:

sending reallocation information for the RB to a user device of which the middle RB is preempted.

In one example, receiving the resource block (RB) location switching request sent by the terminal includes:

receiving a control element (CE) of media access control (MAC) carrying the resource block (RB) location switching request; or receiving radio resource control (RRC) signaling carrying the resource block (RB) location switching request.

In one example, the MAC CE further carries a PHR.

According to a third aspect of the examples of the disclosure, there is provided a data transmission apparatus applied to a terminal, the apparatus including a first sending module, a first receiving module, and a processing module.

The first sending module is configured to send a resource block (RB) location switching request to a base station.

The first receiving module is configured to receive feedback information for the RB location switching request from the base station.

The processing module is configured to transmit data on an RB-before-switching or on an RB-after-switching according to the feedback information.

In one example, the first sending module is further configured to send the resource block (RB) location switching request to the base station in response to the RB-before-switching being an edge RB of a channel bandwidth; where the RB location switching request is configured to request to switch the edge RB to a middle RB of the channel bandwidth; the edge RB includes an edge RB with higher frequency than the middle RB and an edge RB with lower frequency than the middle RB.

In one example, the first sending module is further configured to send the resource block (RB) location switching request to the base station in response to the RB-before-switching being the edge RB of the channel bandwidth and a configured transmitting power of the terminal satisfying a first power condition.

In one example, the configured transmitting power of the terminal satisfies the first power condition includes: a power headroom (PH), obtained by subtracting an actual transmitting power of the terminal from the configured transmitting power of the terminal, is lower than a first power threshold; or, a difference, obtained by subtracting the configured transmitting power from a power corresponding to a power class of the terminal, is higher than a second power threshold.

In one example, the first sending module is further configured to send the resource block (RB) location switching request to the base station in response to the RB-before-switching being the edge RB, the configured transmitting power of the terminal satisfying the first power condition, and an actual transmitting power of the terminal satisfying a second power condition.

In one example, the actual transmitting power of the terminal satisfies the second power condition includes: a difference between a maximum of a maximum power reduction (MPR) and an additional maximum power reduction (A-MPR) of the terminal and a permitted maximum power reduction (P-MPR), is higher than or equal to a third power threshold.

In one example, the third power threshold is a difference between a permitted maximum transmitting power $P_{EMAX.c}$ configured for the terminal by the base station and a location coefficient $\Delta T_C$ of the channel bandwidth for data transmission in a frequency band.

In one example, the first sending module is further configured to determine that the RB-before-switching is the edge RB of the channel bandwidth in response to an MPR value at which the terminal transmits data on the RB-before-switching being greater than an MPR threshold.

In one example, the first sending module is further configured to send the resource block (RB) location switching request to the base station by using a control element (CE) of media access control (MAC) carrying power headroom report (PHR); or send the resource block (RB) location switching request to the base station by using radio resource control (RRC) signaling. According to a fourth aspect of the examples of the disclosure, there is provided a data transmission apparatus applied to a base station, the apparatus including a second receiving module and a second sending module.

The second receiving module is configured to receive a resource block (RB) location switching request sent by a terminal.

The second sending module is configured to send feedback information to the terminal based on the RB location switching request; where, the feedback information is configured to instruct the terminal to transmit data on an RB-before-switching or on an RB-after-switching.

In one example, the second sending module is further configured to send, to the terminal, the feedback information for indicating to transmit data on a switched target RB in response to the channel quality of the switched target RB being greater than a set threshold.

In one example, the RB-before-switching is an edge RB of a channel bandwidth; the RB-after-switching is a middle RB of the channel bandwidth; the edge RB includes an edge RB with higher frequency than the middle RB and an edge RB with lower frequency than the middle RB.

In one example, the second sending module is further configured to send, to the terminal, the feedback information for indicating to transmit data on the middle RB in response to the middle RB being idle.

In one example, the second sending module is further configured to send, to the terminal, the feedback information for indicating to transmit data on the middle RB in response to the middle RB being occupied by a user device located at central area of a cell.

In one example, the second sending module is further configured to send reallocation information for the RB to a user device of which the middle RB is preempted.

In one example, the second receiving module is further configured to receive a control element (CE) of media access control (MAC) carrying the resource block (RB) location switching request; or, receive radio resource control (RRC) signaling carrying the resource block (RB) location switching request.

In one example, the MAC CE further carries a PHR.

According to a fifth aspect of the examples of the disclosure, there is provided a communication device, including:
an antenna;
a memory; and
a processor, in connection with the antenna and the memory respectively, and configured to control the antenna to transceive wireless signals by executing executable program stored on the memory, and capable of implementing the data transmission method provided in any one of the aforementioned technical solutions.

According to a sixth aspect of the examples of the disclosure, there is provided a non-transitory computer-readable storage medium storing an executable program, the executable program, when executed by a processor, implements the steps of the data transmission method according to any one of the aforementioned technical solutions.

In examples of the disclosure, sending the resource block (RB) location switching request to the base station; receiving, from the base station, feedback information for the RB location switching request; and transmitting data on an RB-before-switching or on an RB-after-switching according to the feedback information. Here, the terminal may send the resource block (RB) location switching request to the base station, request the base station to switch the resource block (RB) location, and transmit data on the RB-before-switching or on the RB-after-switching based on the feedback information of the base station. Since the terminal is able to request the base station to flexibly switch the location of the resource block when transmitting data, the location of the resource block is related to power indicators such as maximum power reduction, additional maximum power reduction, etc. of the terminal when transmitting data, in this way, the terminal can reduce the power reduction by switching the location of the resource block (RB), and the uplink coverage capability of the communication network is improved, the efficiency of the power amplifier of the terminal can be improved, and energy saving of the terminal is facilitated.

After considering the specification and practicing the invention disclosed herein, it is easy for those skilled in the art to think of other examples of the disclosure. This disclosure aims to cover any variation, use or adaptive change of this disclosure, which follows the general principles of this disclosure and includes common general knowledge or frequently used technical means in the technical field not disclosed in this disclosure. The description and the examples are regarded as exemplary, and the true scope and spirit of the disclosure are indicated by the following claims.

It should be understood that the present disclosure is not limited to the precise structure described above and shown in the drawings, and various modifications and changes may be made without departing from its scope. The scope of this disclosure is limited by the appended claims.

What is claimed is:

1. A method for data transmission performed by a terminal during data transmission, the method comprising:
    sending a resource block (RB) location switching request to a base station;
    receiving, from the base station, feedback information for the RB location switching request; and
    transmitting data on an RB-before-switching or on an RB-after-switching according to the feedback information;
    wherein sending the RB location switching request to the base station comprises:
        sending the RB location switching request to the base station in response to the RB-before-switching being an edge RB of a channel bandwidth;
        wherein the RB location switching request is configured to request to switch the edge RB to a middle RB of the channel bandwidth, and
        wherein the edge RB comprises an edge RB with higher frequency than the middle RB and an edge RB with lower frequency than the middle RB;
    wherein the method further comprises:
        in response to an MPR value at which the terminal transmits data on the RB-before-switching being greater than an MPR threshold, determining that the RB-before-switching is the edge RB of the channel bandwidth.

2. The method according to claim 1, wherein sending the RB location switching request to the base station in response to the RB-before-switching being the edge RB of the channel bandwidth comprises:
    sending the RB location switching request to the base station in response to the RB-before-switching being the edge RB of the channel bandwidth and a configured transmitting power of the terminal satisfying a first power condition.

3. The method according to claim 2, wherein the configured transmitting power of the terminal satisfies the first power condition comprises:
    a power headroom (PH), obtained by subtracting an actual transmitting power of the terminal from the configured transmitting power of the terminal, is lower than a first power threshold;
    or,
    a difference, obtained by subtracting the configured transmitting power from a power corresponding to a power class of the terminal, is higher than a second power threshold.

4. The method according to claim 2, wherein sending the RB location switching request to the base station in response to the RB-before-switching being the edge RB of the channel bandwidth and the configured transmitting power of the terminal satisfying the first power condition comprises:
    sending the RB location switching request to the base station in response to the RB-before-switching being the edge RB, the configured transmitting power of the terminal satisfying the first power condition, and an actual transmitting power of the terminal satisfying a second power condition.

5. The method according to claim 4, wherein the actual transmitting power of the terminal satisfies the second power condition comprises:
- a difference, between a maximum of a maximum power reduction (MPR) and an additional maximum power reduction (A-MPR) of the terminal and a permitted maximum power reduction (P-MPR), is higher than or equal to a third power threshold.

6. The method according to claim 5, wherein the third power threshold is a difference between a permitted maximum transmitting power $P_{EMAX,c}$ configured for the terminal by the base station and a location coefficient $\Delta T_C$ of the channel bandwidth for data transmission in a frequency band.

7. The method according to claim 1, wherein sending the RB location switching request to the base station comprises:
- sending the RB location switching request to the base station by using a control element (CE) of media access control (MAC) carrying power headroom report (PHR);
or,
- sending the RB location switching request to the base station by using radio resource control (RRC) signaling.

8. A method of data transmission performed by a base station during data transmission, the method comprising:
- receiving a resource block (RB) location switching request sent by a terminal; and
- sending feedback information to the terminal based on the RB location switching request; wherein the feedback information is configured to instruct the terminal to transmit data on an RB-before-switching or on an RB-after-switching;
- wherein the RB-before-switching is an edge RB of a channel bandwidth; the RB-after-switching is a middle RB of the channel bandwidth; the edge RB comprises an edge RB with higher frequency than the middle RB and an edge RB with lower frequency than the middle RB;
- wherein the method further comprises: sending reallocation information for the RB to a user device of which the middle RB is preempted.

9. The method according to claim 8, wherein sending the feedback information to the terminal comprises:
- sending, to the terminal, the feedback information for indicating to transmit data on a switched target RB in response to channel quality of the switched target RB being greater than a set threshold.

10. The method according to claim 8, wherein sending the feedback information to the terminal comprises:
- sending, to the terminal, the feedback information for indicating to transmit data on the middle RB in response to the middle RB being idle; or
- sending, to the terminal, the feedback information for indicating to transmit data on the middle RB in response to the middle RB being occupied by a user device located at central area of a cell.

11. The method according to claim 8, wherein receiving the resource block (RB) location switching request sent by the terminal comprises:
- receiving a control element (CE) of media access control (MAC) carrying the resource block (RB) location switching request;
or,
- receiving radio resource control (RRC) signaling carrying the resource block (RB) location switching request.

12. The method according to claim 11, wherein the MAC CE further carries a PHR.

13. A communication device, comprising:
- an antenna;
- a memory that stores computer-executable instructions; and
- one or more processors that are communicatively coupled to the antenna and the memory respectively,
- wherein the computer-executable instructions when collectively executed by the one or more processors cause the communication device to:
  - send, during data transmission, a resource block (RB) location switching request to a base station;
  - receive, during data transmission, from the base station, feedback information for the RB location switching request; and
  - transmit, during data transmission, data on an RB-before-switching or on an RB-after-switching according to the feedback information;
- wherein send the RB location switching request to the base station comprises:
  - sending the RB location switching request to the base station in response to the RB-before-switching being an edge RB of a channel bandwidth;
  - wherein the RB location switching request is configured to request to switch the edge RB to a middle RB of the channel bandwidth, and
  - wherein the edge RB comprises an edge RB with higher frequency than the middle RB and an edge RB with lower frequency than the middle RB;
- wherein the computer-executable instructions when collectively executed by the one or more processors further cause the communication device to:
  - determine that the RB-before-switching is the edge RB of the channel bandwidth, in response to an MPR value at which the terminal transmits data on the RB-before-switching being greater than an MPR threshold.

14. A non-transitory computer storage medium, storing computer-executable instructions, the computer-executable instructions when executed by a processor of a terminal, cause the terminal to perform the method provided in claim 1.

15. A communication device, comprising:
- an antenna;
- a memory that stores computer-executable instructions; and
- one or more processors that are communicatively coupled to the antenna and the memory respectively,
- wherein the computer-executable instructions when collectively executed by the one or more processors cause the communication device to act as a base station and perform the method provided in claim 8.

16. A non-transitory computer storage medium, storing computer-executable instructions, the computer-executable instructions when executed by a processor of a base station, cause the base station to perform the method provided in claim 8.

* * * * *

UNITED STATES PATENT AND TRADEMARK OFFICE
CERTIFICATE OF CORRECTION

PATENT NO.       : 12,402,103 B2
APPLICATION NO.  : 17/909123
DATED            : August 26, 2025
INVENTOR(S)      : Wei Hong It is certified that error appears in the above-identified patent and that said Letters Patent is hereby corrected as shown below:

In the Specification
In Column 1, Line 20, delete "(OPENX)," and insert -- (OPEX), --, therefor.
In Column 11, Line 50, delete "channel In" and insert -- channel. In --, therefor.
In Column 11, Line 54, delete "cast" and insert -- case --, therefor.
In Column 17, Line 5, delete "channel In" and insert -- channel. In --, therefor.

Signed and Sealed this
Twenty-eighth Day of October, 2025

John A. Squires
*Director of the United States Patent and Trademark Office*